US00RE38567E1

(19) United States
(12) Reissued Patent
Gruenhagen

(10) Patent Number: US RE38,567 E
(45) Date of Reissued Patent: Aug. 24, 2004

(54) APPARATUS AND METHOD FOR SELF ADJUSTING DOWNLINK SIGNAL COMMUNICATION

(75) Inventor: Hartmut H. Gruenhagen, Hermannsburg (DE)

(73) Assignee: Baker Hughes Incorporated, Houston, TX (US)

(21) Appl. No.: 09/778,664

(22) Filed: Feb. 7, 2001

Related U.S. Patent Documents

Reissue of:
(64) Patent No.: 5,963,138
Issued: Oct. 5, 1999
Appl. No.: 09/019,182
Filed: Feb. 5, 1998

(51) Int. Cl.[7] ..... G08B 21/00
(52) U.S. Cl. ..... 340/679; 340/853.1; 340/853.3; 340/853.6; 73/152.01; 175/40; 367/43; 367/83
(58) Field of Search ..... 340/679, 853.1, 340/853.3, 853.6, 606, 609, 384.3, 855.5; 73/152.01; 367/83, 43, 84, 85; 175/40

(56) References Cited

U.S. PATENT DOCUMENTS

| | | | | |
|---|---|---|---|---|
| 3,800,277 A | | 3/1974 | Patton et al. | 340/18 LD |
| 3,971,926 A | * | 7/1976 | Gau et al. | 340/384.3 |
| 4,461,359 A | | 7/1984 | Jones, Jr. et al. | 175/61 |
| 4,515,225 A | * | 5/1985 | Dailey | 175/40 |
| 4,790,393 A | * | 12/1988 | Larronde et al. | 175/40 |
| 5,034,929 A | * | 7/1991 | Cobern et al. | 367/83 |
| 5,113,379 A | | 5/1992 | Scherbatskoy | 367/83 |
| 5,115,415 A | * | 5/1992 | Mumby et al. | 367/85 |
| 5,182,730 A | * | 1/1993 | Scherbatskoy | 367/83 |
| 5,318,409 A | * | 6/1994 | London et al. | 417/53 |
| 5,799,733 A | * | 9/1998 | Ringgenberg et al. | 166/264 |
| 5,812,068 A | * | 9/1998 | Wisler et al. | 340/853.1 |

FOREIGN PATENT DOCUMENTS

| | | |
|---|---|---|
| EP | 0617196 A2 | 9/1994 |
| EP | 0744527 A1 | 11/1996 |

* cited by examiner

*Primary Examiner*—Daniel J. Wu
*Assistant Examiner*—Davetta W. Goins
(74) *Attorney, Agent, or Firm*—Madan, Mossman & Sriram, P.C.

(57) ABSTRACT

An apparatus for sending signals downhole during drilling operations uses a main pump to pump mud from a mud pit at a substantially constant flow rate. The bulk of the pumped mud goes downhole to maintain adequate circulation for the drill bit. A bypass pipe is provided with a shut-off valve that is controlled by an electronic controller. By pulsing the opening and closing of the shut-off valve, the volumetric flow downhole is pulsed. The pulse amplitude and duration can be controlled. These pulses in the flow rate are detected by a suitable downhole device such as a flow rate measurement device, a pressure detector or a turbine. The initial "wake-up" pulse is made long enough so that the detection device downhole is always able to detect it. Subsequent to this wake-up pulse, adjustments are made to the pulse duration, in steps of about 2 seconds, for the smallest pulse period that is detectable downhole. In addition, the amplitude of the pulses is also controlled by regulating the maximum flow through the shut-off valve. The pulses are modulated by a binary sequence of numbers corresponding to the data to be transmitted.

21 Claims, 4 Drawing Sheets

APPARATUS AND METHOD FOR SELF ADJUSTING DOWNLINK SIGNAL COMMUNICATION

Matter enclosed in heavy brackets [ ] appears in the original patent but forms no part of this reissue specification; matter printed in italics indicates the additions made by reissue.

FIELD OF THE INVENTION

The invention relates to the control of downhole drilling equipment by a mud pulse telemetry system, and particularly to an automatic adjustment of the pulse amplitude and duration to account for the attenuation of signals at increased depth.

BACKGROUND OF THE INVENTION

Well bores or boreholes are drilled using a drilling assembly (also referred to as the "bottom hole assembly" or "BHA") carrying a drillbit at its bottom hole end. The BHA includes a variety of sensors to gather information about the wellbore and subsurface formations along with associated processing circuits and microprocessors. Data and signals are transmitted from the surface to control the operation of devices in the BHA. Such devices include motors, hydraulic devices, etc. A number of signal transmission methods have been used to send signals from the surface to a receiver in the BHA. In one such method, an acoustic signal carried by the mud or by the drillstring is used. Electromagnetic signals carried by the drillstring have also been used to transmit information downhole. However, these methods are difficult to use in measurement-while-drilling ("MWD") operations because of the necessity of maintaining an adequate mud flow for drilling operations and of the noise associated with the mud flow and with the rotating drillstring. A common method of communicating the signals downhole is via drilling fluid pressure pulses ("mud poles") generated by altering the rate of flow of the drilling mud used in drilling operations.

This is fraught with problems because of the wear and tear on the mud pumps from constant starting and stopping. A major accompanying problem is that the mud pulses attenuate and disperse as they propagate through the drilling mud. This dispersion is unavoidable and is caused by various mechanisms, including viscous dissipation in the drilling mud as well as frictional energy loss at the borehole walls. This problem is exacerbated with increasing depth of the wellbore. When a square wave is transmitted through a dispersive medium, the received signal is no longer a square wave; instead of a sharp change in amplitude corresponding to the leading and trailing edges of the square wave, the received signal shows a gradual change in amplitude. In addition, the received signal is attenuated compared to the transmitted signal.

Because of the dispersion and attenuation of the signal, detection of the onset of the pulses and the determination of their duration can be difficult. Without proper decoding of the pulses, control of the downloadable equipment is lost. As noted above, the problem gets worse as drilling depth increases due to increased attenuation and dispersion. The ability to detect pulses determines the bandwidth of the mud pulse telemetry link. Prior art techniques have relied on an ad hoc method of dealing with the problem: the pulse duration is increased by predetermined increments as the drilling depth increases. As an example, a pulse duration of 8 seconds is used at shallow depths, of 12 seconds at intermediate depths and of 16 seconds at large depths. This is an inefficient procedure for as it does not allow for maximum data transmission based on the available bandwidth of the data channel. Furthermore, the limited choice of available pulse duration means that if the predetermined discrete values are inadequate, the entire drillstring has to be brought to the surface to adjust the downhole tool for another date rate.

It is desirable to have a method and an apparatus for adjusting the pulse telemetry that automatically adjusts for the attenuation of the signal by adjusting the data rate. The method should preferably make use of the full available bandwidth for signal transmission. It should also not require retrieval of the downhole equipment to modify the data transmission rate. The present invention provides a downhole telemetry system that automatically adjusts the data rate as a function of the deterioration of the transmitted signal during drilling of the wellbore.

SUMMARY OF THE INVENTION

The present invention is a self adjusting communication link incorporating a mud-pulse telemetry system for controlling downhole devices. A main pump operating at a substantially constant flow rate pumps mud from a source thereof, such as a mud pit. The bulk of the pumped mud goes downhole to maintain adequate circulation through the wellbore. A bypass conduit or path is provided with a fluid flow control device that is controlled by a control unit or circuit. The amplitude and duration of the mud pulses are controlled by pulsing the fluid control device. These mud pulses are detected downhole by a suitable device, such as a flow rate measurement device, a pressure detector or a turbine. The initial or "wake-up" pulse is made long enough so that the detection device downhole is always able to detect the wake up pulse. Subsequent to the wake-up pulse, the duration of the data pulses is adjusted, as the drilling progresses, near the smallest duration that is detectable downhole. In the preferred embodiment, the pulse durations are incremented in one or two second increments

DETAILED DESCRIPTION OF THE INVENTION

Figure 1:
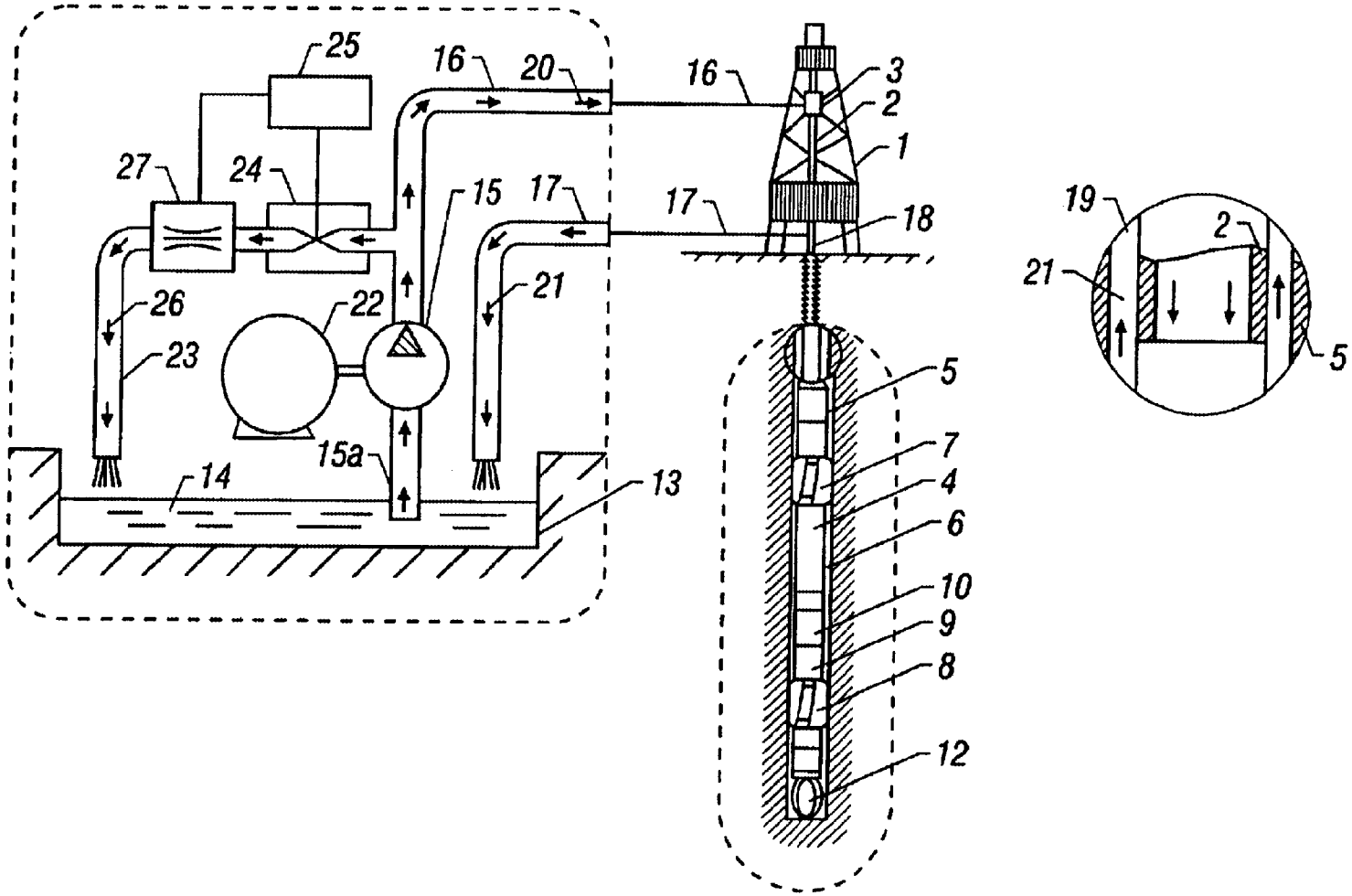
FIG. 1 is a schematic illustration of a drilling rig using the present invention.
Figure 2:
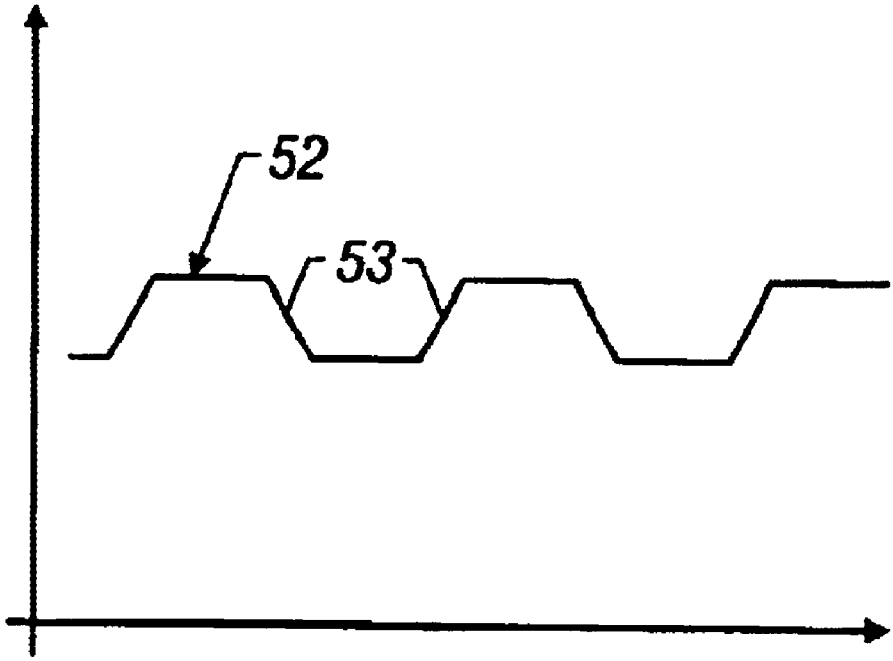
FIG. 2 illustrates the pulse-like pattern of a variation in volumetric flow during the transmission of signals.

The present invention is best understood by reference to the FIGS. 1–3. FIG. 1 is a schematic illustration of a drilling rig 1 that has a swivel head 3 to which is attached the drill string 2. At the bottom of the drill string 2 is a drilling tool 4. The drilling tool 4 is conveyed in the borehole 5 and includes a housing 6. Attached to the housing are stabilizers 7, 8 for stabilizing for reducing vibrations and a non-rotating sleeve 9 with ribs 10 that can be extended and retracted in a controlled fashion. The ribs are used to control the direction of drilling of the tool. The non-rotating sleeve 9 maintains a substantially fixed orientation in the borehole, independent of the rotation of the drill string 2. The drilling tool 4, together with the drill head 12 can be caused to rotate by using the drill string 2.

FIG. 1 also shows a mud pit 13 in which there is a supply of drilling mud 14. A mud pump 15 has an inlet pipe 15a dipping into the mud and a main pipe 16 connected to the swivel head 3. A return pipe 17 connected to the wellhead equipment 18 at the top of the borehole discharges the return mud from the annular space 19 between the walls of the borehole and the drillstring 2 into the mud pit 13.

During operations, the mud pump 15 delivers mud 14 in a circuit in the direction of arrow 20 from the mud tank, downward through the interior of the drillstring 2, up through the annulus 19 to the drill head 12, through the return pipe 17 into the mud pit. The mud pump is driven by motor 22 of constant output and accordingly delivers the mud at a constant flow rate into the main pipe 16.

Connected to the main pipe 16 and discharging into the mud pit 13 is a branch pipe 23 that has a shut-off valve 24. The shut off valve 24 is controlled by controller 25. In the preferred embodiment, the controller is a computer or a processor. By manipulating the shut-off valve 24, the branch pipe 23 may be completely closed or completely opened to allow a portion of the mud to bypass the mud flow to the borehole 5 as shown by the arrow 26. In the preferred embodiment, the shut-off valve 24 is designed to allow adjustment of the maximum flow through the shut-off valve. In the preferred embodiment, this is accomplished by a using a disc valve in which two slots are moved relatively to each other to change the effective nozzle area. The controller 25 adjusts the relative positions of the two slots to adjust the maximum flow deviation in response to the measured downhole flow rate. Such disc valves are known and are not described here.

In an alternate embodiment, the shut-off valve does not have an adjustment for maximum flow rate; instead, downstream of the shut-off valve, there is a throttle 27, by which the maximum amount of volumetric flow change brought about by the branch pipe 23 is controlled. The throttle is also controlled by the controller 25.

During uninterrupted drilling operations, the flow of mud in the main pipe 16 is substantially constant. In order to transmit data downhole, the shut-off valve 24 is actuated so as to open the branch pipe 23. This reduces the flow in the drillstring 2. This change is detected downhole by a suitable device on the drilling tool 4. In the preferred embodiment, this is a turbine/generator combination (not shown) driven by the flow of mud in the drillstring. Those versed in the art would be familiar with such a turbine/generator driven by the flow of mud. Reduction in the rate of flow of the mud would cause a reduction in the rotor speed of such a turbine and hence its output voltage. Conversely, when the shut-off valve is opened, there is an increase in the rate of flow of mud downhole and a corresponding increase in the output voltage of the generator. Other devices, such as a flow rate measurement device or a pressure detector could be used for detection of pulses downhole.

The turbine/generator combination is the preferred downhole detection device because the output of the generator is used to drive other downhole devices. The downhole detector sends a signal (not shown) back to the surface indicating what has been decoded. This is accomplished by using a conventional Measurement While Drilling (MWD) telemetry system. The information to be transmitted uphole is relatively small since all that is essential for the invention is an indication of the data rate at which the downhole detector is decoding. A number of known methods could be used for sending this signal to the surface. This includes an acoustic signal carried by either the mud flowing uphole or by the drillstring or an electromagnetic signal carried by the drillstring. These methods would be familiar to those versed in the art.

Depending on the manner of actuation and design of the shut-off valve, a pulse-like pattern can be imposed on the volumetric flow. This is illustrated in FIG. 2 by the curve 52 of the volumetric flow rate at the surface. The steepness of the flanks 53 depends upon the way and the speed at which the shut off valve is actuated. In order to make the understanding of the invention easier, for the remainder of the discussion it is assumed that the flanks 53 are vertical, so that the curve 52 looks like an idealized square wave superimposed on the steady volumetric rate of flow.

Figure 3A:
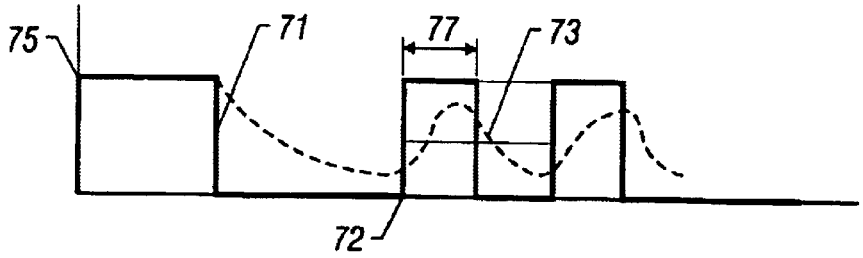
FIGS. 3a–3e illustrate the various types of pulse shapes used to transmit signals downhole according to the present invention.

FIG. 3a shows a comparison between an idealized series of pulses as generated at the surface and the signal received downhole. The curve 71 here is the volumetric bleed-off produced by the opening and closing of the bypass valve rather than the volumetric flow in the main pipe. It has an amplitude given by 75. After a time 72, called the "wake-up" time, the surface signal is a square wave with a period denoted by 77 and an amplitude denoted by 75. Also shown in FIG. 3a is the downhole signal 73 corresponding to the transmitted surface signal 71. As can be seen, the square wave is considerably smoothed out and somewhat attenuated. Nevertheless, a periodicity associated with 75 is still detectable. Given proper decoding, the transmitted signal can still be recovered. The method for decoding such a signal would be familiar to those of knowledgeable in the art.

Figure 3B:
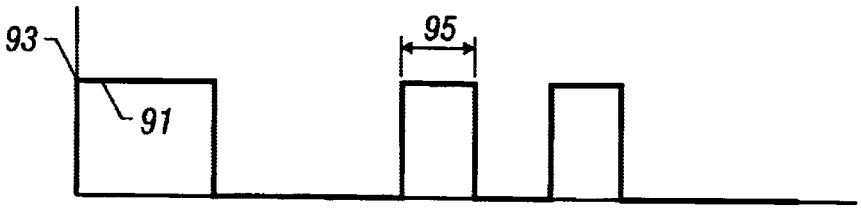
Figure 3C:
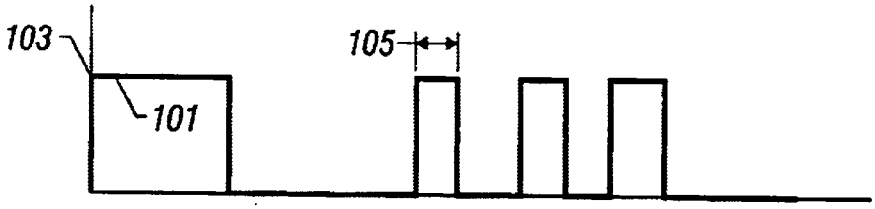

FIG. 3b is simply a reproduction of a portion of FIG. 3a. The transmitted signal 91, characterized by an amplitude 93 and a period of 95 is shown. FIG. 3c is similar to FIG. 3b with a transmitted signal 101 having an amplitude 103 and period 105. However, the period 105 of the signal is less than the period 95 of the signal in FIG. 3b. As long as the downhole signal corresponding to this surface signal can be properly decoded, it can be seen that the signal in FIG. 3c has the capability of carrying more information than the signal in FIG. 3b. Within a given time interval, more bits (zeros and ones) can be accommodated. One of the features of the present invention is the ability to vary the time period of the signal.

Figure 3D:
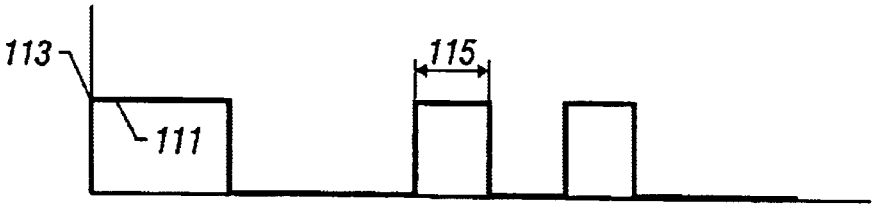
Figure 3E:
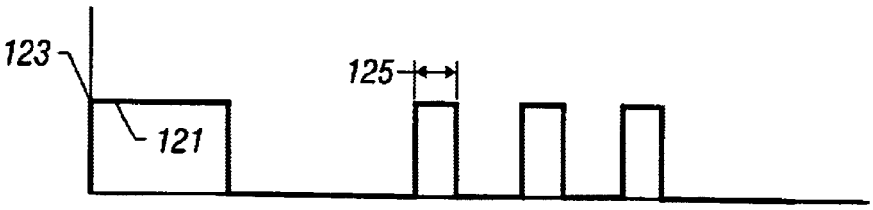

FIG. 3d illustrates another variation of the transmitted signal. In FIG. 3d, the transmitted signal 111 has the same period 115 as the signal in FIG. 3b; however, its amplitude 113 is different. This is accomplished by changing the maximum amount of the volumetric flow possible in the branch pipe 23. FIG. 3e illustrates yet variation of the transmitted signal. Here, both the amplitude 123 and the period 125 of the pulse are different from the reference pulse in FIG. 3b.

Figure 4:
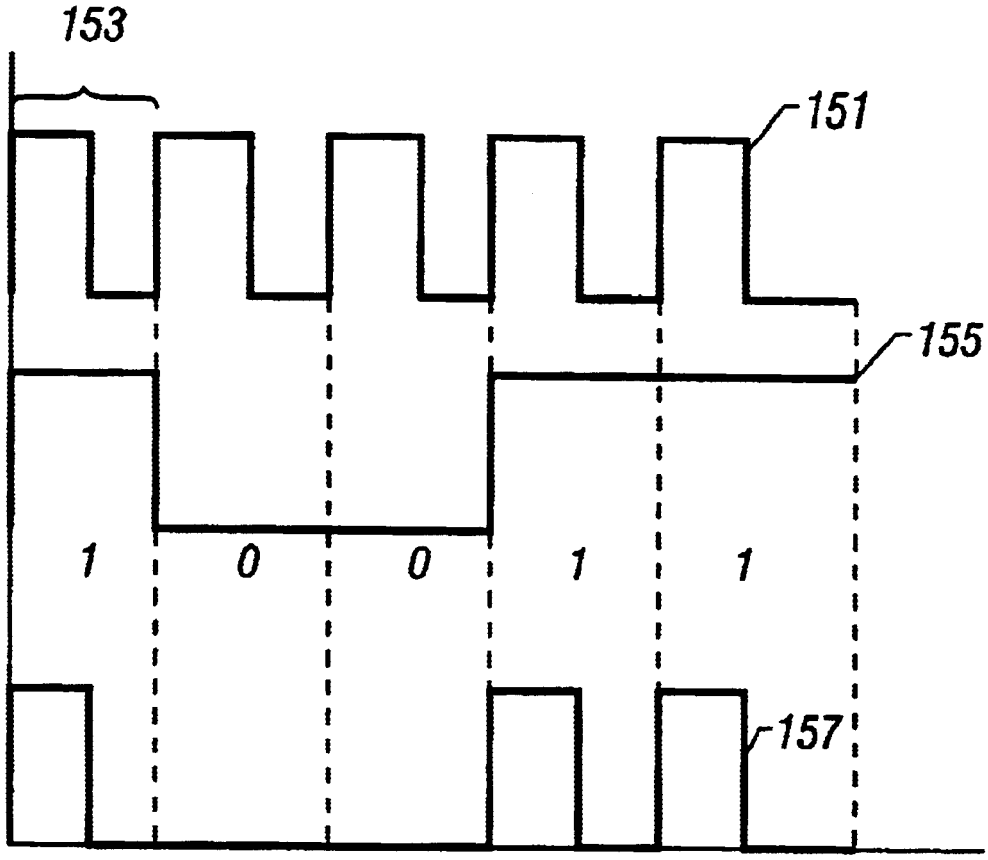
FIG. 4 illustrates the modulation of a square wave by a data sequence.

As would be familiar to those versed in the art, a data message can be coded as a sequence of zeros and ones. The present invention can be used to perform communication from the surface to the downhole equipment by encoding the sequence of square wave pulses discussed above with the sequence of zeros and ones describing the message to be transmitted. This encoding is readily performed by modulating the square wave pulse with the sequence of zeros and ones describing the data. FIG. 4 illustrates the result of modulating a square wave sequence. The top curve 151 illustrates an unmodulated square wave sequence having a period 153. The data message denoted by 155 corresponds to the binary sequence 10011. The result of modulating the square wave sequence 151 by the modulating signal 155 is the curve 157. This can be used to change the flow rate and control the downhole equipment for a variety of purposes, including control signals for a directional drilling tool, signals for switching operating modes of individual components of the underground system.

The ability to vary both the amplitude and the period of the signal is the basis for the adaptive nature of the present invention. The changes in the period can also be encoded as part of the signal. The first bit, which is used to start the data transmission, takes on one of a discrete set of values. The initial pulse is made sufficiently wide so that the detection device is always able to determine the beginning of the command signal, i.e., able to wake up. Corresponding to each of these values of the initial pulse is a value of the data rate to follow. For example, a data rate of 8 seconds might correspond to an initial pulse of 20 seconds, a data rate of 12 seconds would correspond to an initial pulse of 25 seconds while a data rate of 16 seconds would correspond to an initial pulse of 30 seconds. These values are for illustrative purposes only and in actual practice, many more values could be used. In actual practice, the pulse width is maintained at the shortest time period that is detectable by the downhole device. The downhole tool sends a response signal back to the surface control device indicating that a pulse has been detected downhole. If, within a prespecified time interval after initiating a pulse sequence, the surface control unit fails to receive a response signal indicating detection of the pulse, the surface control unit adjusts the parameters of the pulse to increase the likelihood of detection. For example, the data period could be increased in steps of, say, 2 seconds, until it is correctly detected and an indication received at the surface. Alternatively, the amplitude of the pulses is increased. This is done by changing the maximum flow through the shut-off valve 24. As noted above, this is done by adjusting a throttle in the branch pipe 23 or by using a valve, such as a disc valve, as the shut-off valve. If, however, the amplitude is already at the maximum possible value for the apparatus, the period would be increased. Following this, the encoded data is used to determine the flow rate of the mud.

Persons of ordinary skill in the art will appreciate that many modifications may be made to the embodiments described herein without departing from the spirit of the present invention. Accordingly, the embodiments described herein as illustrative only and are not intended to limit the scope of the present invention.

We claim:

[1. An apparatus for transmitting data during drilling operations between a surface location and a downhole location in a borehole comprising:

(a) a pump at the surface for pumping mud from a source thereof;

(b) a conduit for transporting the mud to the borehole;

(c) a by-pass coupled to the conduit for selectively diverting the flow of mud in the conduit;

(d) a flow control device associated with the by-pass;

(e) a controller operatively connected to the flow control device to control the flow through the flow control device and cause a pulsed variation in the pressure of the mud in the conduit indicative of the data to be transmitted; and (f) a downhole detection device adapted to detect said pulsed variation in the pressure of the mud.]

[2. The apparatus of claim 1 wherein the flow control device is a valve having an open position and a closed position.]

[3. The apparatus of claim 2 further comprising a throttle associated with the by-pass, said throttle adapted to adjust the maximum rate of flow through the by-pass.]

[4. The apparatus of claim 2 wherein the valve is a disk valve with a fixed slot and a rotatable slot, the rotatable slot adapted to be moved in response to a signal from the controller to adjust a maximum rate of flow in the valve.]

[5. The apparatus of claim 1 wherein the controller is a computer.]

[6. The apparatus of claim 1 wherein the pulsed variation in the pressure of the mud further comprises a "wake-up" pulse having a length followed by a sequence of square wave pulses having an amplitude and a period.]

[7. The apparatus of claim 6 wherein the downhole detection device is further adapted to send a response signal indicative of detection of a square wave pulse.]

[8. The apparatus of claim 7 wherein controller changes said amplitude of the square wave pulses after a predetermined time interval upon failure to receive a response signal at the surface location.]

[9. The apparatus of claim 7 wherein the controller changes and amplitude of the square wave pulse and said period of the square wave after a predetermined time interval upon failure to receive a response signal at the surface location.]

[10. The apparatus of claim 1 wherein the downhole detection devices comprises a flow rate measurement device.]

[11. The apparatus of claim 1 wherein the downhole detection devices comprises a pressure detector.]

[12. The apparatus of claim 1 wherein the downhole detection device comprises a turbine/generator combination.]

[13. A method for transmitting data during drilling operations between the surface and a downhole location in a borehole comprising:

(a) pumping mode from a source thereof through a conduit into a drill string disposed in the borehole;

(d) using a controller to divert part of the mud into a by-pass coupled to the conduit, thereby changing a rate of flow of mud in the conduit and generating mud pulses indicative of the data to be transmitted, said mud pulses having a predetermined rate and an amplitude; and (c) detecting the mud pulses downhole and transmitting to the controller a response signal indicating detection of said pulses.]

[14. The method of claim 13 further comprises using the controller to change the characteristics of the mud pulses upon failure to receive a response signal within a predetermined interval by changing at least one of (i) the amplitude of the mud pulses, and (ii) the predetermined rate of the mud pulses.]

[15. The method of claim 13 further comprising using the controller to generate a "wake up" pulse, said "wake-up" pulse having a period, preceding the mud pulses having an amplitude and a predetermined rate.]

[16. The method of claim 13 further comprising using a flow control device in the by-pass, said flow control device being operated by the controller.]

[17. The apparatus of claim 1 wherein the pump at the surface pumps mud at a substantially constant flow rate.]

[18. The method of claim 13 wherein the step of pumping mud further comprises pumping mud at a substantially constant flow rate.]

*19. An apparatus for transmitting data during drilling operations between a surface location and a downhole location in a borehole comprising:*

(*a*) *a pump at the surface for pumping mud from a source thereof;*

(*b*) *a conduit for transporting the mud to the borehole;*

(*c*) *a by-pass coupled to the conduit for selectively diverting the flow of mud in the conduit;*

(*d*) *a flow control device associated with the by-pass;*

(*e*) *a controller operatively connected to the flow control device to control the flow through the flow control device and cause a pulsed variation in the pressure of the mud in the conduit indicative of the data to be transmitted, said controller further adapted for altering a parameter of said pulsed variation; and*

(*f*) *a downhole detection device adapted to detect said pulsed variation in the pressure of the mud.*

*20. The apparatus of claim 19 wherein the flow control device comprises a valve having an open position and a closed position.*

*21. The apparatus of claim 20 further comprising a throttle associated with the by-pass, said throttle adapted to adjust the maximum rate of flow through the by-pass.*

*22. The apparatus of claim 20 wherein the valve comprises a disk valve with a fixed slot and a rotatable slot, the rotatable slot adapted to be moved in response to a signal from the controller to adjust a maximum rate of flow in the valve.*

*23. The apparatus of claim 19 wherein the controller comprises a computer.*

*24. The apparatus of claim 19 wherein the pulsed variation in the pressure of the mud further comprises a "wake-up" pulse.*

*25. The apparatus of claim 24 wherein the downhole detection device is further adapted to send a response signal indicative of detection of a received pulse.*

*26. The apparatus of claim 25 wherein said controller changes an amplitude of the square wave pulse after a predetermined time interval upon failure to receive said response signal at the surface location.*

*27. The apparatus of claim 25 wherein the controller changes said amplitude of the square wave pulse and said period of the squares wave after a predetermined time interval upon failure to receive said response signal at the surface location.*

*28. The apparatus of claim 19 wherein the downhole detection devices comprises a flow rate measurement device.*

*29. The apparatus of claim 19 wherein the downhole detection devices comprises a pressure detector.*

*30. The apparatus of claim 19 wherein the downhole detection device comprises a turbine/generator combination.*

*31. The apparatus of claim 19 wherein said altered parameter further comprises at least one of* (*i*) *an amplitude of a pulse, and,* (*ii*) *a period of a pulse.*

*32. The apparatus of claim 19 wherein the pump at the surface pumps mud at a substantially constant flow rate.*

*33. A method for transmitting data during drilling operations between the surface and a downhole location in a borehole comprising:*

(*a*) *pumping mud from a source thereof through a conduit into a drill string disposed in the borehole;*

(*b*) *using a controller to divert part of the mud into a by-pass coupled to the conduit, thereby changing a rate of flow of the mud in the conduit and generating mud pulses indicative of the data to be transmitted, said mud pulses having a predetermined rate and an amplitude; and*

(*c*) *detecting the mud pulses downhole and transmitting to the controller a response signal indicating detection of said pulses; and*

(*d*) *using said controller for altering a parameter of said mud pulses in response to a predetermined condition.*

*34. The method of claim 33 further comprising using the controller to change the characteristics of the mud pulses upon failure to receive a response signal within a predetermined interval by changing at least one of* (*i*) *the amplitude of the mud pulses, and* (*ii*) *the predetermined rate of the mud pulses.*

*35. The method of claim 33 further comprising using the controller to generate a "wake up" pulse.*

*36. The method of claim 35 wherein said "wake-up" pulse has a period.*

*37. The method of claim 33 further comprising using a flow control device in the by-pass, said flow control device being operated by the controller.*

*38. The method of claim 33 wherein pumping said mud further comprises pumping mud at a substantially constant flow rate.*

*39. The method of claim 35 wherein said predetermined condition comprises a failure of said controller to receive a response to a "wake up" pulse.*

* * * * *